(12) United States Patent
Huang et al.

(10) Patent No.: US 8,477,433 B2
(45) Date of Patent: Jul. 2, 2013

(54) OPTICAL IMAGING LENS ASSEMBLY

(75) Inventors: Hsin-Hsuan Huang, Taichung (TW); Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 143 days.

(21) Appl. No.: 13/170,397

(22) Filed: Jun. 28, 2011

(65) Prior Publication Data

US 2012/0176687 A1    Jul. 12, 2012

(30) Foreign Application Priority Data

Jan. 12, 2011  (TW) .............................. 100101119 A

(51) Int. Cl.
*G02B 3/02* (2006.01)
*G02B 13/18* (2006.01)

(52) U.S. Cl.
USPC .......................................... 359/715; 359/708

(58) Field of Classification Search
USPC .................. 359/708, 713, 714, 715
See application file for complete search history.

(56) References Cited

U.S. PATENT DOCUMENTS 7,365,920 B2    4/2008  Noda
2010/0271713 A1*  10/2010  Tang et al. ..................... 359/715

FOREIGN PATENT DOCUMENTS

TW    98144682    * 12/2009

* cited by examiner

*Primary Examiner* — James Greece
*Assistant Examiner* — Sharrief Broome
(74) *Attorney, Agent, or Firm* — Morris Manning & Martin LLP; Tim Tingkang Xia, Esq.

(57) ABSTRACT

An optical imaging lens assembly includes, in order from an object side to an image side, a first lens element with positive refractive power, a second lens element with negative refractive power, a third lens element with positive refractive power, and a fourth lens element with negative refractive power. The third lens element includes a convex image-side surface. The fourth lens element includes a concave image-side surface, and at least one of two surfaces of the fourth lens element is aspheric. Additionally, the optical imaging lens assembly also includes an aperture stop and an image sensor disposed at an image plane. By adjusting the relationship among the above-mentioned lens elements, the aperture stop, the image sensor and the image plane, the optical imaging lens assembly can effectively reduce the total optical length and correct the aberration as well as the chromatism to obtain superior imaging quality.

16 Claims, 8 Drawing Sheets

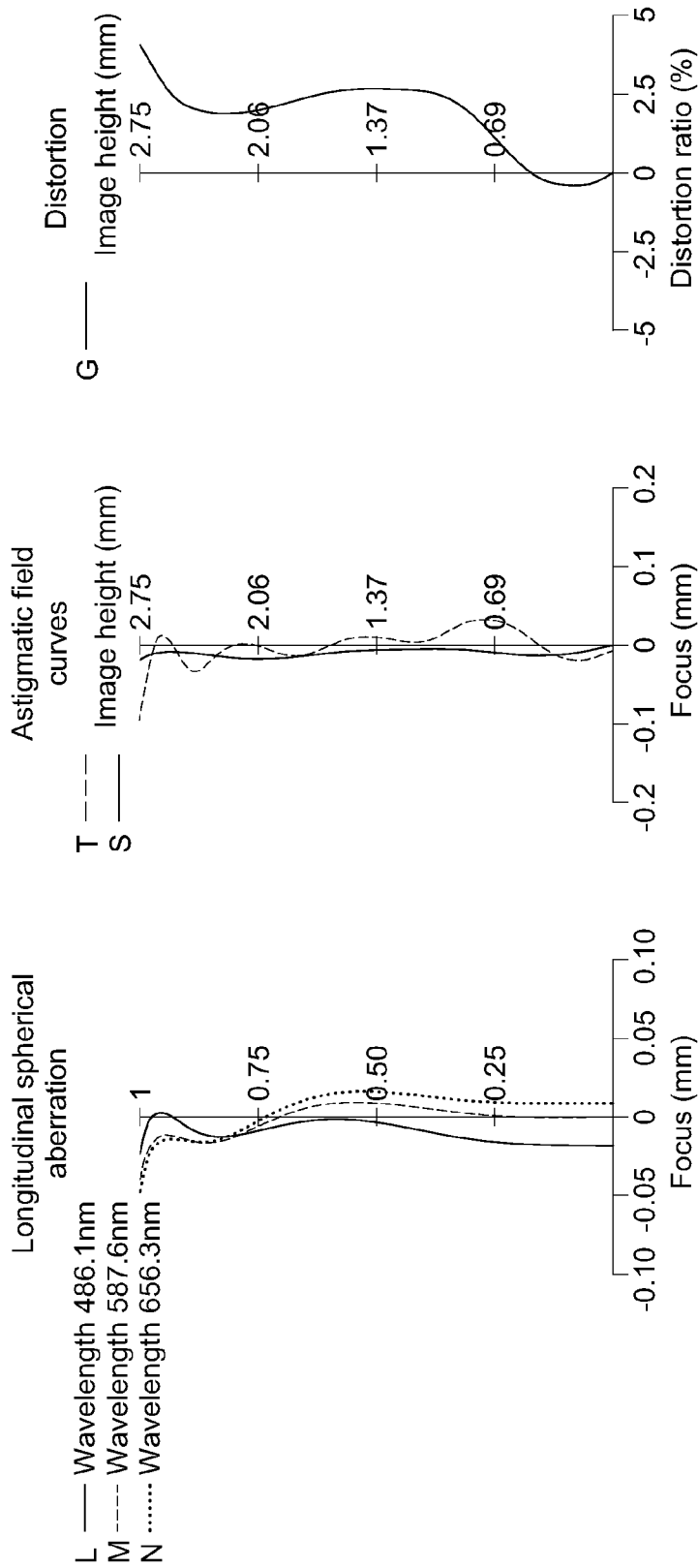

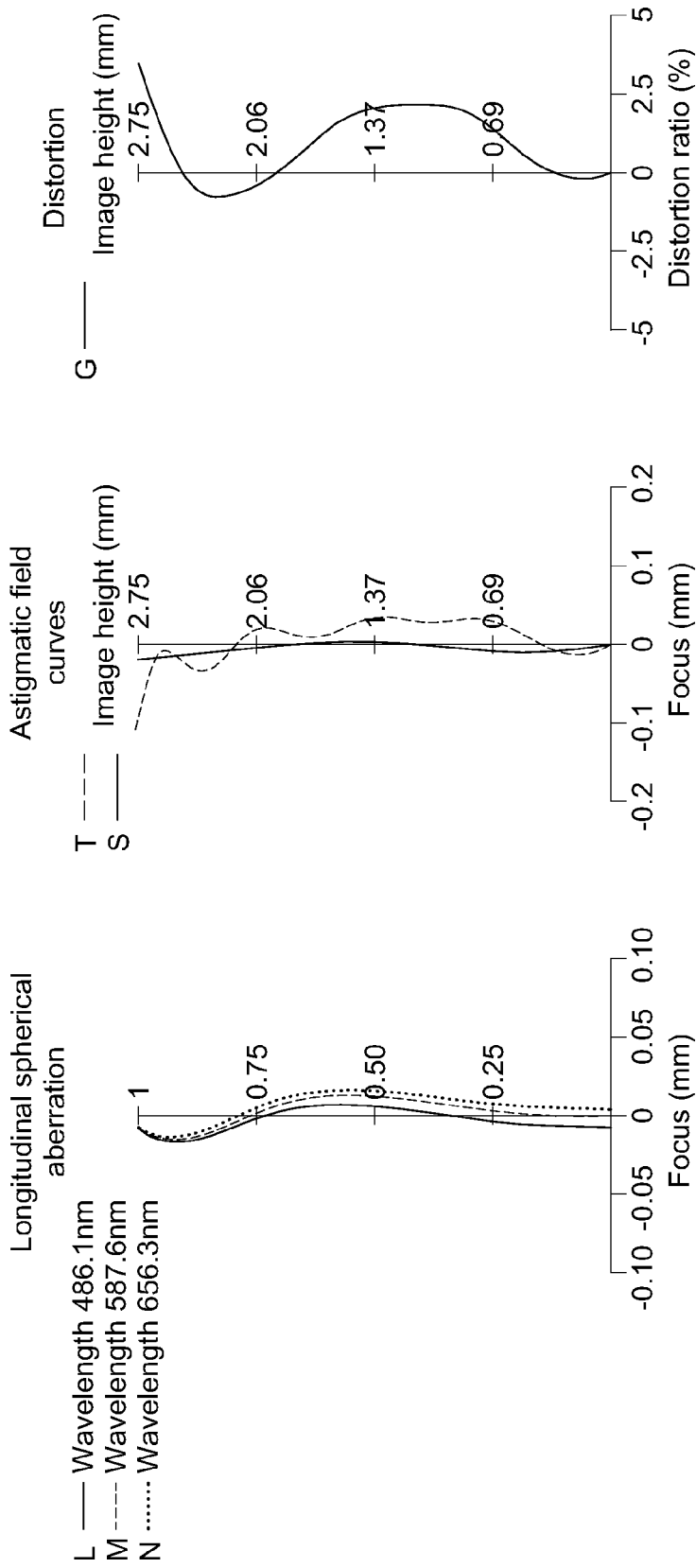

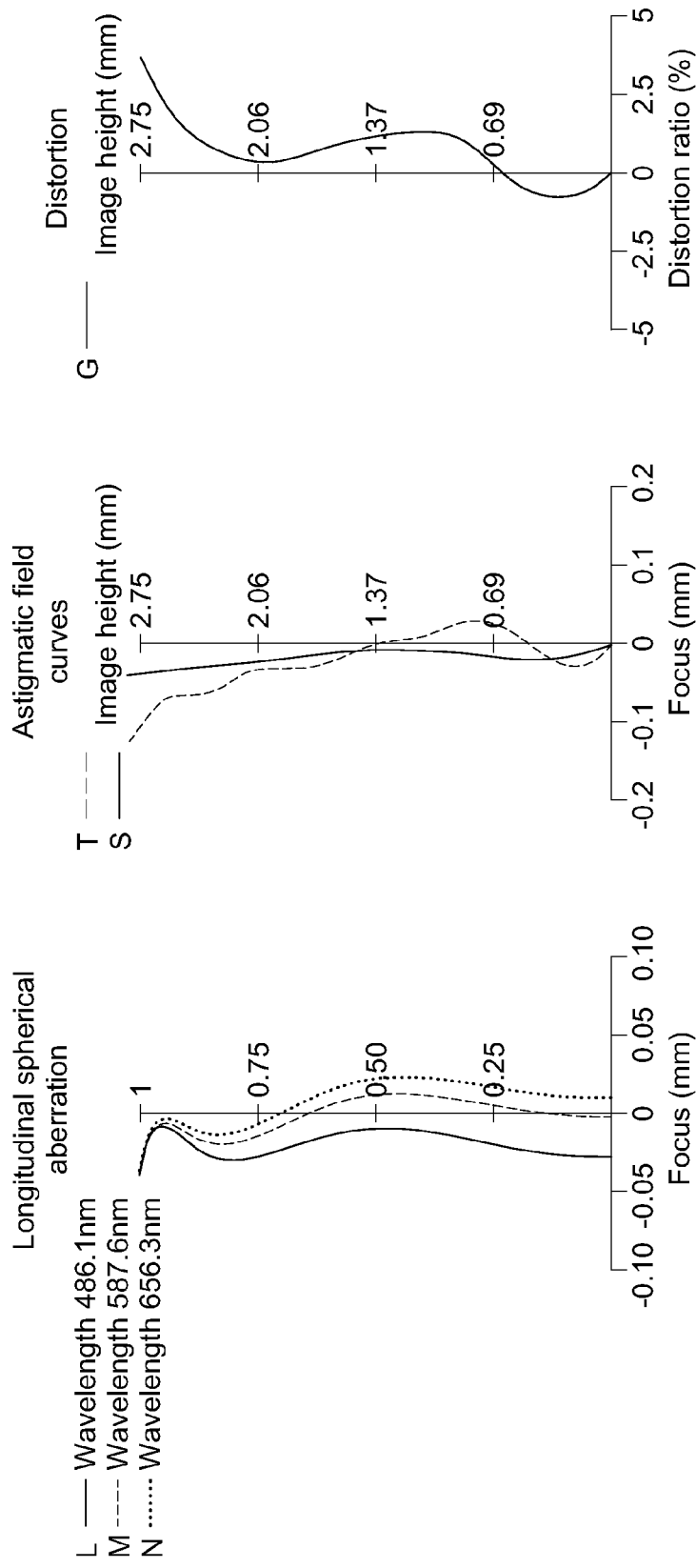

OPTICAL IMAGING LENS ASSEMBLY

CROSS-REFERENCE TO RELATED APPLICATIONS

This non-provisional application claims priority under 35 U.S.C. §119(a) on Patent Application No(s). 100101119 filed in Taiwan, R.O.C. on Jan. 12, 2011, the entire contents of which are hereby incorporated by reference.

BACKGROUND

1. Technical Field

The present disclosure relates to an optical imaging lens assembly, and more particularly to an optical imaging lens assembly having multiple lens elements.

2. Related Art

In recent years, with the rise of mobile electronic device featuring camera functionalities, the demand for miniaturized camera lenses increases exponentially. The photo-sensing device, e.g. a sensor, of an ordinary photographing camera is commonly selected from a charge coupled device (CCD) and a complementary metal-oxide semiconductor (CMOS). In addition, as the advancing semiconductor manufacturing technology enables the miniaturization of the pixel size of sensors, there is an increasing demand for compact camera lenses featuring better image quality.

A conventional high resolution camera lens usually comprises an aperture placed in front of the camera lens and four lens elements. For example, U.S. Pat. No. 7,365,920 discloses an optical lens system for taking image which comprises a first lens element and a second lens element that are both glass spherical lens elements. The first lens element and the second lens element are bonded to each other to form a doublet lens element for correcting chromatic aberration. However, it is difficult to manufacture the doublet lens element due to the difficult process of bonding the glass lens elements. In addition, with the development of electronic devices heading toward the direction of light in weight and small in size, the weight and the high manufacturing costs of the conventional high resolution spherical camera lens become a problem. Therefore, the inventors recognize that an optical imaging system capable of improving the image quality of mobile electronic devices as well as miniaturizing the overall size of the camera lens equipped therewith is urgently needed.

SUMMARY

An embodiment of the present disclosure discloses an optical imaging lens assembly comprising, in order from an object side to an image side: a first lens element with positive refractive power having a object-side surface, a second lens element with negative refractive power, a third lens element with positive refractive power having a convex image-side surface, and a fourth lens element with negative refractive power having a concave image-side surface and an object-side surface. At least one of the object-side and the image-side surfaces of the fourth lens element is aspheric. The optical imaging lens assembly further includes a stop and an image sensor disposed on an image plane.

$R_7$ is the radius of curvature of the object-side surface of the fourth lens element. $R_8$ is the radius of curvature of the image-side surface of the fourth lens element. SL is the axial distance between the stop and the image plane. TTL is the axial distance between the object-side surface of the first lens element and the image plane, and Imgh is one half of the diagonal length of the effective photosensitive area of the image sensor. The optical imaging lens assembly satisfies the following conditions:

$-0.7 < R_8/R_7 \leq 0.0$  (Condition 1):

$0.9 < SL/TTL < 1.1$  (Condition 2):

$1.15 < TTL/Imgh < 1.65$  (Condition 3):

According to another embodiment of the present disclosure, an optical imaging lens assembly further satisfies the following condition:

$0.1 < CT_2/T_{23} < 0.4$  (Condition 4):

Wherein $CT_2$ is the thickness of the second lens element near the optical axis, and $T_{23}$ is the axial distance between the second lens element and the third lens element.

BRIEF DESCRIPTION OF THE DRAWINGS

The present disclosure will become more fully understood from the following detailed description when taken in connection with the accompanying drawings, which show, for purpose of illustrations only, and thus do not limit other possible applications derived from the spirit of the present disclosure, and wherein:

FIG. 1B is a schematic view of longitudinal spherical aberration curves when the lights having wavelengths of 486.1 nm, 587.6 nm, and 656.3 nm are respectively projected in the optical imaging lens assembly in FIG. 1A;

FIG. 1C is a schematic view of astigmatic field curves when the light having the wavelength of 587.6 nm is projected in the optical imaging lens assembly in FIG. 1A;

FIG. 1D is a schematic view of a distortion curve when the light having the wavelength of 587.6 nm is projected in the optical imaging lens assembly in FIG. 1A;

FIG. 2B is a schematic view of longitudinal spherical aberration curves when the lights having wavelengths of 486.1 nm, 587.6 nm, and 656.3 nm are respectively projected in the optical imaging lens assembly in FIG. 2A;

FIG. 2C is a schematic view of astigmatic field curves when the light having the wavelength of 587.6 nm is projected in the optical imaging lens assembly in FIG. 2A;

FIG. 2D is a schematic view of a distortion curve when the light having the wavelength of 587.6 nm is projected in the optical imaging lens assembly;

FIG. 3B is a schematic view of longitudinal spherical aberration curves when the lights having wavelengths of 486.1 nm, 587.6 nm, and 656.3 nm are respectively projected in the optical imaging lens assembly in FIG. 3A;

FIG. 3C is a schematic view of astigmatic field curves when the light having the wavelength of 587.6 nm is projected in the optical imaging lens assembly in FIG. 3A;

FIG. 3D is a schematic view of a distortion curve when the light having the wavelength of 587.6 nm is projected in the optical imaging lens assembly in FIG. 3A;

DETAILED DESCRIPTION

Figure 1A:
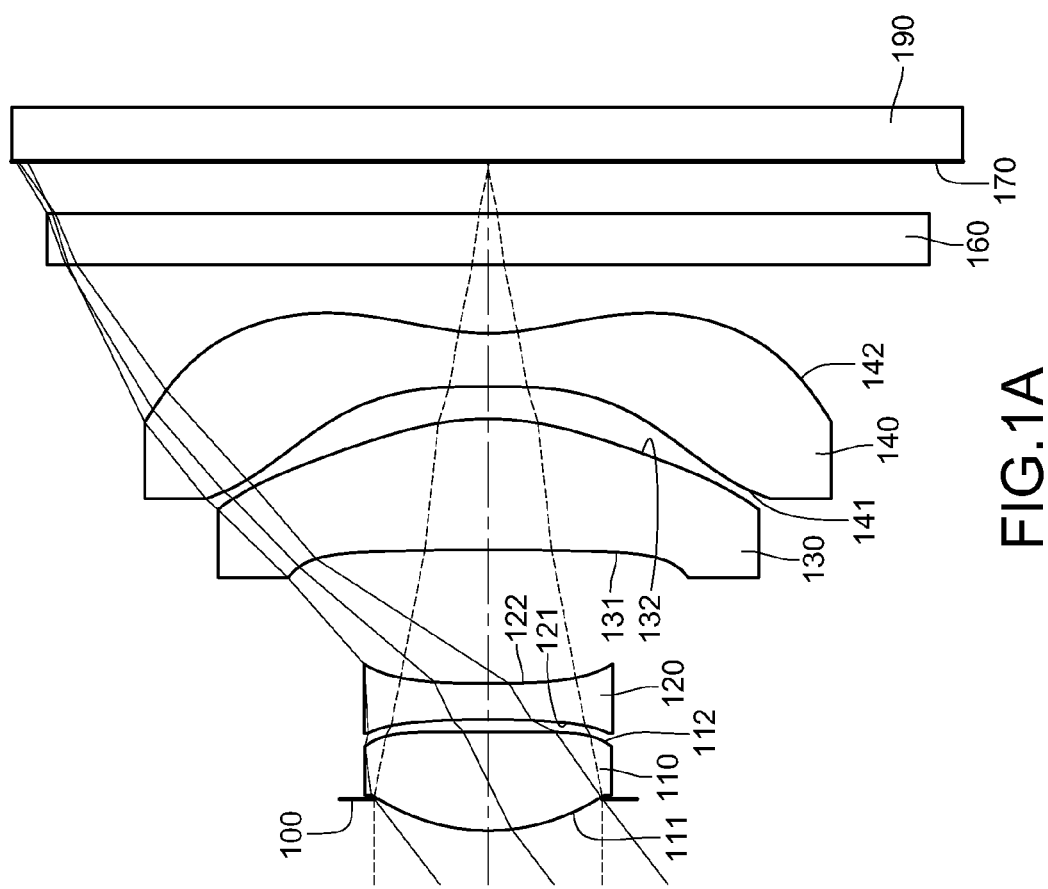
FIG. 1A is a schematic structural view of a first embodiment of an optical imaging lens assembly according to the present invention.

One of the embodiments of the photographing optical lens assemblies of the present invention is described with FIG. 1A as an example, to illustrate the lens combinations, the configuration relationships and the conditions of the photographing optical lens assemblies that are commonly owned by the embodiments of the invention. The differences between the embodiments will be described in detail in embodiments other than the embodiment described in FIG. 1A.

Taking FIG. 1A as an example, the optical imaging lens assembly 10 comprises, from an object side to an image side along an optical axis (from left to right in FIG. 1A) in sequence, a first lens element 110, a second lens element 120, a third lens element 130, a fourth lens element 140, and an image sensor 190 disposed on an image plane 170. In this and some embodiments, the optical imaging lens assembly 10 further comprises an infrared filter 160.

The first lens element 110 comprises an object-side surface 111 and an image-side surface 112. The refractive power of the first lens element 110 is positive for providing partial refractive power of the optical imaging lens assembly 10 and shortening the total optical length of the optical imaging lens assembly 10. Moreover, the object-side surface 111 of the first lens element 110 can be convex to increase the positive refractive power of the first lens element 110 so that the total optical length of the optical imaging lens assembly 10 is further shortened.

The second lens element 120 comprises an object-side surface 121 and an image-side surface 122. The refractive power of the second lens element 120 is negative for effectively correcting the aberration and the chromatism of the optical imaging lens assembly 10. Moreover, when the object-side surface 121 of the second lens element 120 is concave, the aberration and the chromatism of the optical imaging lens assembly 10 is corrected.

The third lens element 130 comprises an object-side surface 131 and an image-side surface 132. The refractive power of the third lens element 130 is positive to effectively distribute the refractive power of the optical imaging lens assembly 10 to reduce the sensitivity of the optical imaging lens assembly 10. Moreover, when the image-side surface 132 of the third lens element 130 is convex, the astigmatism and the high order aberration of the optical imaging lens assembly 10 are corrected.

The fourth lens element 140 comprises an object-side surface 141 and an image-side surface 142. The refractive power of the fourth lens element 140 is negative to effectively correct the high order aberration of the optical imaging lens assembly 10. Moreover, when the image-side surface 142 of the fourth lens element 140 is concave, the principal point of the optical imaging lens assembly 10 may be positioned far away from the image plane 170 to effectively reduce the total optical length of the optical imaging lens assembly 10 and, therefore, maintain the optical imaging lens assembly 10 in a compact form. At least one of the object-side 141 and the image-side 142 surfaces of the fourth lens element 140 is aspheric.

In addition, the second lens element 120 can be made of plastic to reduce the weight and the manufacturing costs of the optical imaging lens assembly 10 and also benefit the manufacturing of the aspheric lens element.

The optical imaging lens assembly 10 of the present disclosure satisfies the following conditions:

$-0.7 < R_8/R_7 \leq 0.0$ (Condition 1):

$0.9 < SL/TTL < 1.1$ (Condition 2):

$1.15 < TTL/Imgh < 1.65$ (Condition 3):

Wherein $R_7$ is the radius of curvature of the object-side surface 141 of the fourth lens element 140; $R_8$ is the radius of curvature of the image-side surface 142 of the fourth lens element 140. SL is the axial distance between the aperture stop 100 and the image plane 170; TTL is the axial distance between the object-side surface 111 of the first lens element 110 and the image plane 170. Imgh is one half of the diagonal length of the effective photosensitive area of the image sensor 190.

In the optical imaging lens assembly 10, the positive refractive power of the first lens element 110 provides partial refractive power needed by the optical imaging lens assembly 10 for shortening the total optical length of the photographing optical lens assembly 10. The negative refractive power of the second lens element 120 can effectively correct the aberration and the chromatism of the optical imaging lens assembly 10. The positive refractive power of the third lens element 130 and the positive refractive power of the first lens element 110 can effectively reduce the sensitivity of the optical imaging lens assembly 10. The negative refractive power of the fourth lens element 140 provides the partial negative refractive power needed by the optical imaging lens assembly 10 to effectively correct the high order aberration of the optical imaging lens assembly 10. Furthermore, the astigmatism and the high order aberration of the optical imaging lens assembly 10 are corrected because the image-side surface 132 of the third lens element 130 is convex. Because the image-side surface 142 of the fourth lens element 140 is concave, the principal point of the optical imaging lens assembly 10 can be positioned far away from the image plane 170, and, therefore, the total optical length of the optical imaging lens assembly 10 is effectively reduced for miniaturization of the optical imaging lens assembly 10.

When satisfying Condition 1, the radiuses of curvature of the object-side surface of the fourth lens element and the image-side surface of the fourth lens element are favorable for correcting the aberration of the optical imaging lens assembly 10.

When the optical imaging lens assembly 10 satisfies Condition 2, the total optical length of the optical imaging lens assembly 10 can be effectively reduced, and the exit pupil of the optical imaging lens assembly 10 is far away from the image plane 170. Consequently, light is projected onto the image plane 170 with a relatively small incident angle, creating the telecentric feature of the image side. Therefore, when the image sensor 190 is disposed to the image plane 170, the photosensitive ability of the image sensor 190 is improved to reduce the occurrence of shading on the image generated by the image sensor 190.

When the optical imaging lens assembly 10 satisfies Condition 3, the total optical length of the optical imaging lens assembly 10 is short enough to keep the optical imaging lens assembly 10 compact. In this and some embodiments, the optical imaging lens assembly 10 further satisfies 1.2<TTL/Imgh<1.5. In addition, the optical imaging lens assembly 10 can also satisfy the following condition:

$$0.1 < CT_2/T_{23} < 0.4 \quad \text{(Condition 4)}:$$

Wherein $CT_2$ is the thickness of the second lens element 120 near the optical axis; $T_{23}$ is the axial distance between the image-side surface 122 of the second lens element 120 and the object-side surface 131 of the third lens element 130.

When the optical imaging lens assembly 10 satisfies Condition 4, the thickness of 20 the second lens element 120, i.e. the axial distance between the object-side surface 121 and the image-side surface 122, and the axial distance between the second lens element 120 and the third lens element 130, i.e. the axial distance between the image-side surface 122 of the second lens element 120 and the object-side surface 131 of the third lens element 130, are suitable for effectively reducing the total optical length of the optical imaging lens assembly 10.

Moreover, the optical imaging lens assembly 10 of the present disclosure may further satisfy at least one of the following conditions:

$$2.8 \text{ mm (millimeter)} < TTL < 4.3 \text{ mm} \quad \text{(Condition 5)}:$$

$$25 < V_1 - V_2 < 40 \quad \text{(Condition 6)}:$$

$$-3.0 < f_4/T_{23} < -1.5 \quad \text{(Condition 7)}:$$

$$0.13 \text{ mm} < CT_2 < 0.3 \text{ mm} \quad \text{(Condition 8)}:$$

$$4.5 < 10 \times (CT_2/CT_4) < 9.5 \quad \text{(Condition 9)}:$$

$$0.1 < T_{23}/f < 0.3 \quad \text{(Condition 10)}:$$

$$0.5 < (R_2 + R_1)/(R_2 - R_1) < 1.5 \quad \text{(Condition 11)}:$$

$$0 < f_3/|R_5| < 0.2 \quad \text{(Condition 12)}:$$

wherein $V_1$ is the Abbe number of the first lens element 110; $V_2$ is the Abbe number of the second lens element 120; $f_4$ is the focal length of the fourth lens element 140; $CT_4$ is the thickness of the fourth lens element 140 near the optical axis, i.e. the axial distance between the object-side surface 141 and the image-side surface 142; f is the focal length of the optical imaging lens assembly 10; $R_1$ is the radius of curvature of the object-side surface 111; $R_2$ is the radius of curvature of the image-side surface 112; $f_3$ is the focal length of the third lens element 130, and $R_5$ is the radius of curvature of the object-side surface 131.

When the optical imaging lens assembly 10 satisfies Condition 5, the optical 20 imaging lens assembly 10 can maintain a compact size which is favorable for the installation of the optical imaging lens assembly 10 into the mobile electronic devices. When the optical imaging lens assembly 10 of the present disclosure satisfies Condition 6, the chromatism of the optical imaging lens assembly 10 is corrected.

When the optical imaging lens assembly 10 satisfies Condition 7, the negative refractive power of the fourth lens element 140 is favorable to correct the high order aberration. When the optical imaging lens assembly 10 satisfies Condition 8, the second lens element 120 has the appropriate thickness that the total optical length of the optical imaging lens assembly 10 can be reduced and the optical imaging lens assembly 10 can be fabricated effectively. When the optical imaging lens assembly 10 satisfies Condition 9, the second lens element 120 and the fourth lens element 140 have the appropriate thicknesses, and, thereby, the negative refractive power of the optical imaging lens assembly 10 is effectively distributed to reduce the sensitivity of the optical imaging lens assembly 10.

When the optical imaging lens assembly 10 satisfies Condition 10, the optical imaging lens assembly 10 has the proper axial distance between the image-side surface 122 and the object-side surface 131, which is favorable for fabricating as well as reducing the total optical length. When the optical imaging lens assembly 10 satisfies Condition 11, the spherical aberration of the optical imaging lens assembly 10 is corrected. When the optical imaging lens assembly 10 satisfies Condition 12, the radius of curvature of the object-side surface 131 of the third lens element 130 is favorable for correcting the aberration of the optical imaging lens assembly 10.

Furthermore, in the optical imaging lens assembly 10, all the lenses (that is, the first lens element 110, the second lens element 120, the third lens element 130, and the fourth lens element 140) may be made of glass or plastic. If a lens is made of glass, there is more freedom in distributing the refractive power of the optical imaging lens assembly 10. If a lens is made of plastic, the manufacturing cost can be effectively reduced. In addition, the surfaces of the lens can be aspheric. Aspheric shapes can be easily made into all kinds of shapes except for spherical. The aspheric shapes also allow more design parameter freedom which can be used to reduce aberrations and total number of the lens elements, so that the total optical length of the optical imaging lens assembly 10 can be reduced effectively.

In the optical imaging lens assembly 10, a convex surface of a lens means the surface of the lens is convex at a paraxial site. A concave surface of a lens means the surface of the lens is concave at a paraxial site.

In addition, at least one stop (such as glare stops, field stops, or other types of stops) may be disposed within the optical imaging lens assembly 10 if necessary to eliminate the unwanted rays and provide other improvements concerning the image quality, or to adjust the size of the object image.

In the optical imaging lens assembly 10, the specific schemes are further described with the following embodiments. Parameters in the embodiments are defined as follow: Fno is an f-number value of the optical imaging lens assembly 10, and HFOV is one half of the maximal viewing angle in the optical imaging lens assembly 10. The aspheric surface in the embodiments may be represented by, but not limited, to the following aspheric surface equation (Condition ASP):

$$X(Y) = (Y^2/R)/(1 + sqrt(1 - (1+k)*(Y/R)^2)) + \sum_i (Ai)*(Y^i)$$

Wherein Y is the distance from the point on the curve of the aspheric surface to the optical axis, X is the height of a point on the aspheric surface at a distance Y from the optical axis relative to the tangential plane at the aspheric surface vertex, k is a cone factor, Ai is an $i^{th}$ order aspheric surface coefficient, and in the embodiments, i may be, but is not limited to, 4, 6, 8, 10, 12, 14, 16, 18 and 20

The First Embodiment (Embodiment 1)

FIG. 1A is a schematic structural view of a first embodiment of an optical imaging lens assembly according to the present disclosure. As shown in FIG. 1A, the optical imaging lens assembly 10 comprises, in order from an object side to an image side (from left to right in FIG. 1A), the aperture stop 100, the first lens element 110, the second lens element 120, the third lens element 130, the fourth lens element 140, and the image sensor 190, which is disposed on an image plane 170. In this and some embodiments, the optical imaging lens assembly 10 further comprises the infrared filter 160.

In this embodiment, for example, the wavelength of the light received by the optical imaging lens assembly 10 is 587.6 nm. However, the wavelength of the light received by the optical imaging lens assembly 10 may be adjusted according to actual requirements, and is not limited to the wavelength value mentioned above.

In this embodiment, the refractive power of the first lens element 110 is positive, and the object-side surface 111 of the first element 110 is convex. The refractive power of the second lens element 120 is negative and the object-side surface 121 of the second element 120 is concave. The refractive power of the third lens element 130 is positive and the image-side surface 132 of the third lens element 130 is convex. The refractive power of the fourth lens element 140 is negative and the image-side surface 142 of the fourth lens element 140 is concave.

The detailed data of the optical imaging lens assembly 10 is as shown in Table 1-1 below.

TABLE 1-1

Embodiment 1
f = 3.45 mm, Fno = 2.60, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.185 | | | | |
| 2 | Lens 1 | 1.186240 (ASP) | 0.574 | Plastic | 1.530 | 55.8 | 2.35 |
| 3 | | 20.435100 (ASP) | 0.074 | | | | |
| 4 | Lens 2 | −5.353500 (ASP) | 0.210 | Plastic | 1.633 | 23.4 | −5.25 |
| 5 | | 8.895600 (ASP) | 0.779 | | | | |
| 6 | Lens 3 | −23.649100 (ASP) | 0.763 | Plastic | 1.634 | 23.8 | 2.97 |
| 7 | | −1.763810 (ASP) | 0.187 | | | | |
| 8 | Lens 4 | −1000.000000 (ASP) | 0.312 | Plastic | 1.583 | 30.2 | −2.12 |
| 9 | | 1.240130 (ASP) | 0.400 | | | | |
| 10 | IR-filter | Plano | 0.300 | Glass | 1.516 | 64.1 | — |
| 11 | | Plano | 0.301 | | | | |
| 12 | Image | Plano | — | | | | |

Note:
Reference wavelength is d-line 587.6 nm

Furthermore, it can be observed from Table 1-1 that the surfaces of the first lens element 110, the second lens element 120, the third lens element 130, and the fourth lens element 140 are aspheric. The aspheric surfaces satisfy Condition ASP, but are not limited thereto. As for the parameters of the aspheric surfaces, reference is made to Table 1-2 below.

TABLE 1-2

Aspheric Coefficients

| | Surface# | | | |
|---|---|---|---|---|
| | 2 | 3 | 4 | 5 |
| k | −7.43911E−01 | −7.16450E−00 | 4.01760E+01 | 9.00000E+01 |
| $A_4$ | 7.42273E−02 | −1.08594E−01 | 7.69779E−02 | 2.65386E−01 |
| $A_6$ | −1.66992E−01 | −4.83988E−01 | −5.18086E−01 | −4.37532E−01 |
| $A_8$ | 7.90101E−01 | 9.04872E−01 | 1.56604E+00 | 2.30703E+00 |
| $A_{10}$ | −2.17211E+00 | −3.08588E+00 | −4.20354E+00 | −5.36754E+00 |
| $A_{12}$ | 3.58868E+00 | 3.92738E+00 | 4.48854E+00 | 7.11145E+00 |
| $A_{14}$ | −4.01353E+00 | −3.18702E+00 | −1.89837E+00 | −4.11683E+00 |
| $A_{16}$ | 4.80128E−01 | 8.96498E−01 | −2.57101E−02 | 4.71930E−01 |

| | Surface# | | | |
|---|---|---|---|---|
| | 6 | 7 | 8 | 9 |
| k | −9.00000E+01 | −2.84068E+00 | 9.00000E+01 | −1.66696E+01 |
| $A_4$ | −6.15485E−02 | −1.92481E−01 | −8.28577E−01 | −2.10298E−02 |
| $A_6$ | 2.80051E−01 | 7.48311E−01 | 1.77897E+00 | −1.45305E−01 |

TABLE 1-2-continued

Aspheric Coefficients

| $A_8$ | −5.80856E−01 | −1.16114E+00 | −2.74427E+00 | 1.72775E−01 |
|---|---|---|---|---|
| $A_{10}$ | 5.71712E−01 | 9.73673E−01 | 2.67353E+00 | −1.10624E−01 |
| $A_{12}$ | −3.17388E−01 | −4.58746E−01 | −1.63028E+00 | 4.41682E−02 |
| $A_{14}$ | 9.24650E−02 | 1.13603E−01 | 6.25355E−01 | −1.12528E−02 |
| $A_{16}$ | −1.58873E−02 | −1.14962E−02 | −1.46663E−01 | 1.76218E−03 |
| $A_{18}$ | — | — | 1.91975E−02 | −1.54053E−04 |
| $A_{20}$ | — | — | −1.07438E−03 | 5.80046E−06 |

In Table 1-1, the curvature radius, the thickness and the focal length are shown in millimeters (mm). Surface numbers 0-12 represent the surfaces sequentially arranged from the object-side to the image-side along the optical axis. "f" stands for the focal length, "Fno" is the f-number, and "HFOV" is the half field of view of this embodiment. In Table 1-2, k represents the conic coefficient of the equation of the aspheric surface profiles. A1-A20 represent the aspheric coefficients ranging from the 1st order to the 20th. All labels for Tables of the remaining embodiments share the same definitions as those in Table 1-1 and Table 1-2 of the first embodiment, and their definitions will not be stated again.

The content of Table 1-3 may be deduced from Table 1-1.

TABLE 1-3

Embodiment 1

| f (mm) | 3.45 | $T_{23}/f$ | 0.23 |
|---|---|---|---|
| Fno | 2.60 | $CT_2/T_{23}$ | 0.27 |
| HFOV (deg.) | 37.5 | $10 * (CT_2/CT_4)$ | 6.73 |
| $V_1 - V_2$ | 32.40 | $CT_2$ (mm) | 0.21 |
| $(R_2 + R_1)/(R_2 - R_1)$ | 1.12 | TTL (mm) | 3.60 |
| $R_8/R_7$ | −0.001 | SL/TTL | 0.95 |
| $f_3/|R_5|$ | 0.13 | TTL/Imgh | 1.38 |
| $f_4/T_{23}$ | −2.72 | | |

It can be observed from Table 1-3, in this embodiment, the $R_8/R_7$ of the optical imaging lens assembly 10 is −0.001, which satisfies the Condition 1. The SL/TTL of the optical imaging lens assembly 10 is 0.95, which satisfies the Condition 2. The TTL/Imgh of the optical imaging lens assembly 10 is 1.38, which satisfies the Condition 3. The $CT_2/T_{23}$ of the optical imaging lens assembly 10 is 0.27, which satisfies the Condition 4.

The TTL of the optical imaging lens assembly 10 is 3.60 mm, which satisfies the Condition 5. The $V_1-V_2$ of the optical imaging lens assembly 10 is 32.40, which satisfies the Condition 6. The $f_4/T_{23}$ of the optical imaging lens assembly 10 is −2.72, which satisfies the Condition 7. The $CT_2$ of the optical imaging lens assembly 10 is 0.21 mm, which satisfies the Condition 8.

The $10*(CT_2/CT_4)$ of the optical imaging lens assembly 10 is 6.73, which satisfies the Condition 9. The $T_{23}/f$ of the optical imaging lens assembly 10 is 0.23, which satisfies the Condition 10. The $(R_2+R_1)/(R_2-R_1)$ of the optical imaging lens assembly 10 is 1.12, which satisfies the Condition 11. The $f_3/|R_5|$ of the optical imaging lens assembly 10 is 0.13, which satisfies the Condition 12.

FIG. 1B is a schematic view of longitudinal spherical aberration curves when the lights having wavelengths of 486.1 nm, 587.6 nm, and 656.3 nm are respectively projected in the optical imaging lens assembly in FIG. 1A. The longitudinal spherical aberration curve of the light having the wavelength of 486.1 nm in the optical imaging lens assembly 10 is indicated by a solid line L in FIG. 1B. The longitudinal spherical aberration curve of the light having the wavelength of 587.6 nm in the optical imaging lens assembly 10 is indicated by a dashed line M in FIG. 1B. The longitudinal spherical aberration curve of the light having the wavelength of 656.3 nm in the optical imaging lens assembly 10 is indicated by a dotted line N in FIG. 1B. Horizontal axis is the focus position (millimeter, mm), and vertical axis is the normalized entrance pupil or aperture value. In other words, after the paraxial light and the fringe light which are parallel to the optical axis enter in the wide angle photographic lens assembly 10, the differences between the focus positions of the paraxial light (the longitudinal coordinate is close to 0) and the fringe light (the longitudinal coordinate is close to 1) can be observed from the longitudinal spherical aberration curves. It can be observed from FIG. 1B that, when the different wavelengths, 486.1 nm, 587.6 nm, or 656.3 nm, of the light are received by the optical imaging lens assembly 10 of this embodiment, the longitudinal spherical aberrations generated by the optical imaging lens assembly 10 are within a range of −0.050 mm to 0.020 mm.

Figure 3A:
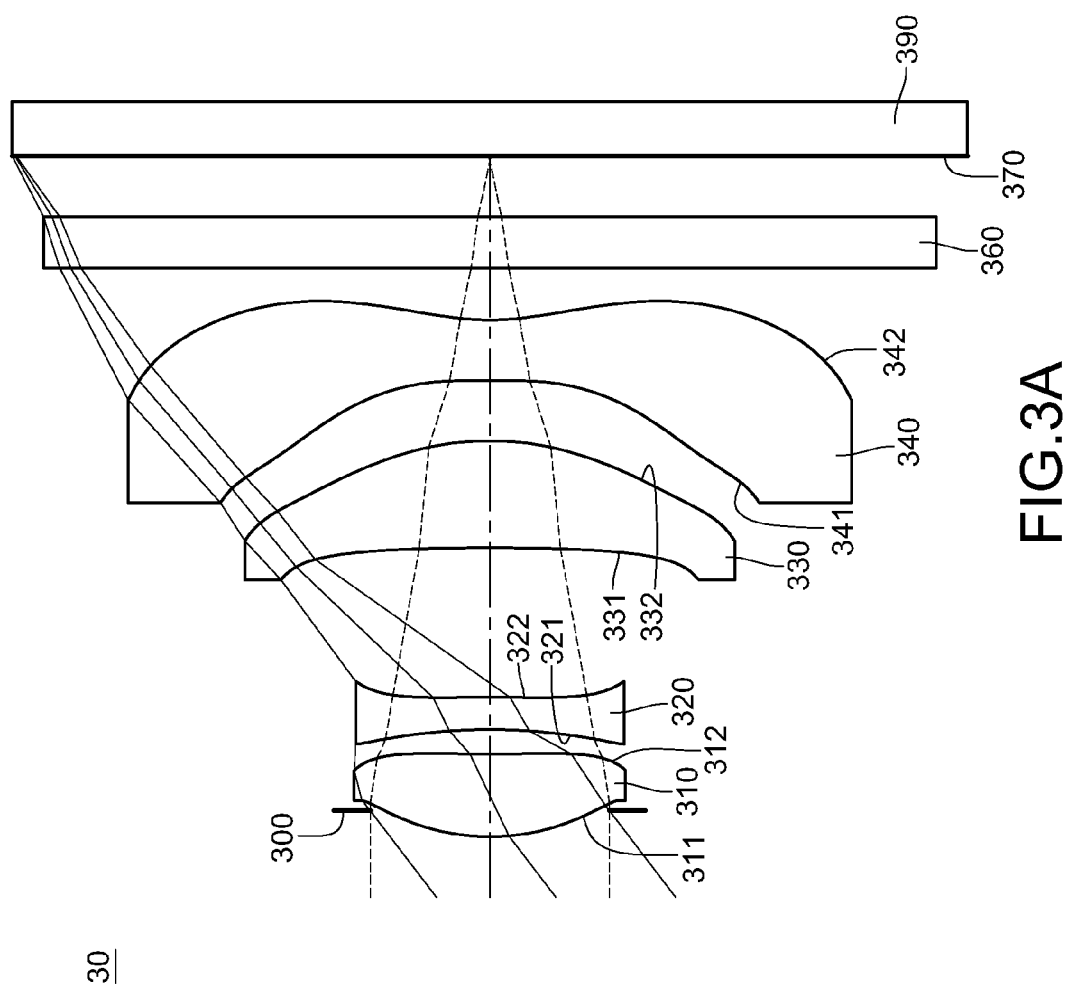
FIG. 3A is a schematic structural view of a third embodiment of an optical imaging lens assembly according to the present invention.
Figure 4A:
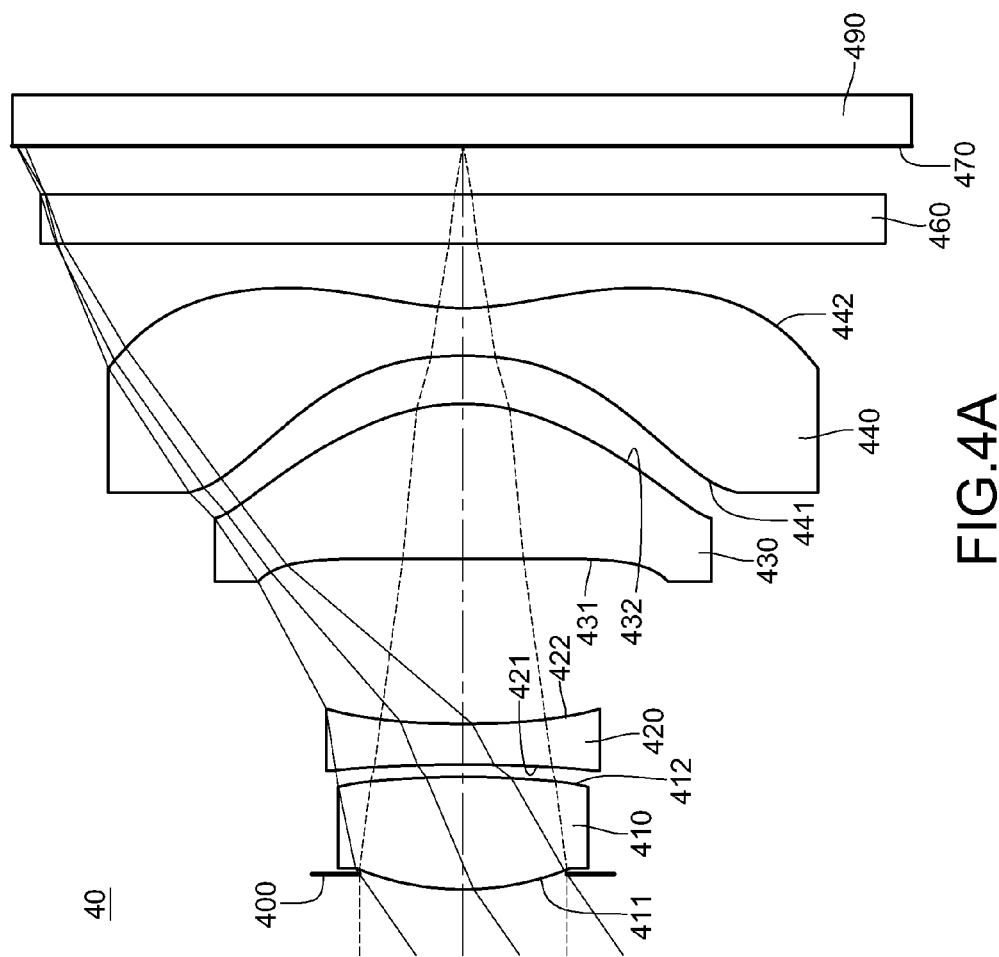
FIG. 4A is a schematic structural view of a fourth embodiment of an optical imaging lens assembly according to the present invention.
Figures 4B, 4C, 4D:
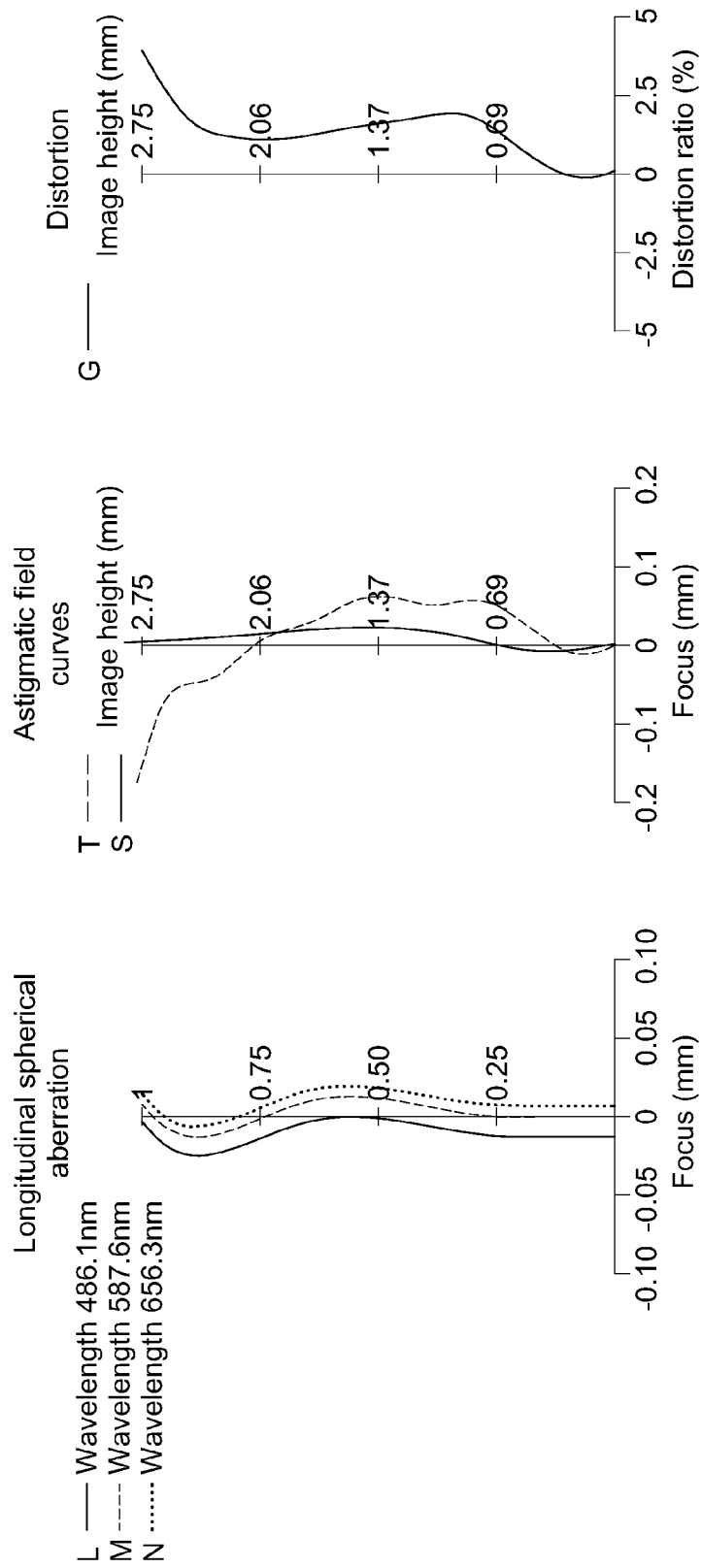
FIG. 4B is a schematic view of longitudinal spherical aberration curves when the lights having wavelengths of 486.1 nm, 587.6 nm, and 656.3 nm are respectively projected in the optical imaging lens assembly in FIG. 4A.
FIG. 4C is a schematic view of astigmatic field curves when the light having the wavelength of 587.6 nm is projected in the optical imaging lens assembly in FIG. 4A.
FIG. 4D is a schematic view of a distortion curve when the light having the wavelength of 587.6 nm is projected in the optical imaging lens assembly in FIG. 4A.

In the second embodiment to the fourth embodiment and the schematic views of the longitudinal spherical aberration curves in FIGS. 2B, 3B, and 4B, the solid line L indicates the longitudinal spherical aberration curve of the light having the wavelength of 486.1 nm; the dashed line M indicates the longitudinal spherical aberration curve of the light having the wavelength of 587.6 nm, and the dotted line N indicates the longitudinal spherical aberration curve of the light having the wavelength of 656.3 nm, which will not be repeated herein for conciseness.

FIG. 1C is a schematic view of astigmatic field curves when the light having the wavelength of 587.6 nm is projected in the optical imaging lens assembly 10 in FIG. 1A. An astigmatic field curve of a tangential plane is a dashed line T in FIG. 1C. An astigmatic field curve of a sagittal plane is a solid line S in FIG. 1C. Horizontal axis is the focus position (mm), and vertical axis is the image height (mm). In other words, the differences in the focus position due to different curvatures of the tangential plane and the sagittal plane can be observed from the astigmatic field curves. It can be observed from FIG. 1C that, when the light having the wavelength of 587.6 nm is projected in the optical imaging lens assembly 10, the astigmatic field curvature of the tangential plane generated is within a range of −0.100 mm to 0.050 mm, and the astigmatic field curvature of the sagittal plane is within a range of −0.050 mm to 0.0 mm.

From the second embodiment to the fourth embodiment, the schematic views of the astigmatic field curves in FIGS. 2C, 3C, and 4C, the solid line S indicates the astigmatic field curve of the sagittal plane, and the dashed line T indicates the astigmatic field curve of the tangential plane, which will not be repeated herein for conciseness.

FIG. 1D is a schematic view of a distortion curve when the light having the wavelength of 587.6 nm is projected in the optical imaging lens assembly in FIG. 1A. The horizontal axis is the distortion ratio (%), and the vertical axis is the image height (mm). In other words, the differences of the distortion ratios caused by different image heights can be observed from the distortion curve G. It can be observed from FIG. 1D that, the distortion ratio generated when the light having the wavelength of 587.6 nm is projected in the optical imaging lens assembly 10 is within a range of −0.5% to 4%. As shown in FIGS. 1B to 1D, the optical imaging lens assembly 10, designed according to the first embodiment, is capable of effectively correcting various aberrations.

From the second embodiment to the fourth embodiment, the schematic views of the distortion curves in FIGS. 2D, 3D, and 4D, the solid line G indicates the distortion curve of the light having the wavelength of 587.6 nm, which will not be repeated herein for conciseness.

The distortion curves and the astigmatic field curves generated when the lights having the wavelength of 486.1 nm and 656.3 nm are projected in the optical imaging lens assembly 10 are very similar to the distortion curve and the astigmatic field curves generated when the light having the wavelength of 587.6 nm is projected in the optical imaging lens assembly 10. In order to prevent the visual confusion about in FIGS. 1C and 1D, the distortion curve and the astigmatic field curves generated when the lights having the wavelength of 486.1 nm and 656.3 nm projected in the optical imaging lens assembly 10 are not shown in FIGS. 1C and 1D and throughout the rest of the embodiments of this present disclosure as well.

The Second Embodiment (Embodiment 2)

Figure 2A:
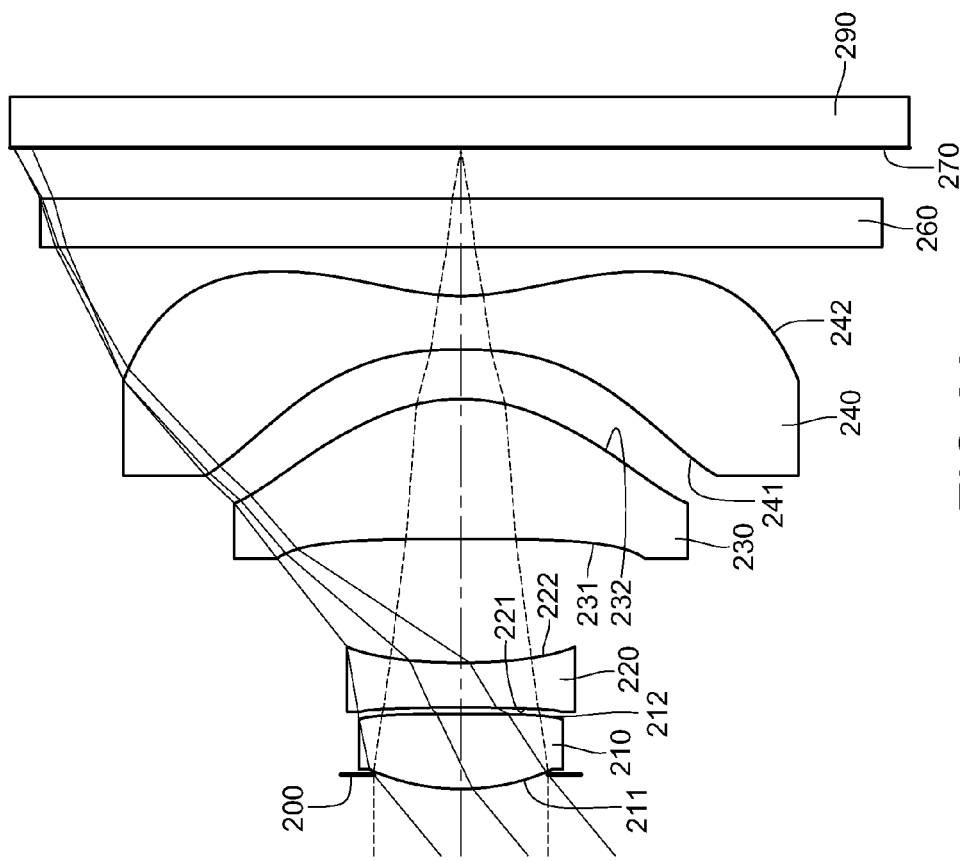
FIG. 2A is a schematic structural view of a second embodiment of an optical imaging lens assembly according to the present invention.

FIG. 2A is a schematic structural view of a second embodiment of an optical imaging lens assembly according to the present disclosure. The specific implementation and the elements of the second embodiment are substantially the same as those in the first embodiment. The element symbols in the second embodiment corresponds to the symbols in the first embodiment and have the same function or structure, but the element symbols in the second embodiment all begin with "2". For conciseness, only the differences among embodiments are illustrated below, and the similarities will not be repeated herein.

In this embodiment, for example, the wavelength of the light received by the optical imaging lens assembly 20 is 587.6 nm, but this wavelength may be adjusted according to actual requirements and is not limited to the wavelength value mentioned above.

In this embodiment, the refractive power of a first lens element 210 is positive and the first element 210 has a convex object-side surface 211. The refractive power of a second lens element 220 is negative and the second element 220 has a concave object-side surface 221. The refractive power of a third lens element 230 is positive and the third lens element 230 has a convex image-side surface 232. The refractive power of a fourth lens element 240 is negative and the fourth lens element 240 has a concave image-side surface 242.

The detailed data of the optical imaging lens assembly 20 is as shown in Table 2-1 below.

TABLE 2-1

Embodiment 2
f = 3.45 mm, Fno = 2.60, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.089 | | | | |
| 2 | Lens 1 | 1.371850 (ASP) | 0.464 | Plastic | 1.544 | 55.9 | 2.32 |
| 3 | | −13.804500 (ASP) | 0.040 | | | | |
| 4 | Lens 2 | −8.796800 (ASP) | 0.275 | Plastic | 1.634 | 23.8 | −4.38 |
| 5 | | 4.110200 (ASP) | 0.762 | | | | |
| 6 | Lens 3 | −55.422200 (ASP) | 0.862 | Plastic | 1.544 | 55.9 | 2.23 |
| 7 | | −1.191950 (ASP) | 0.305 | | | | |
| 8 | Lens 4 | −3.823900 (ASP) | 0.330 | Plastic | 1.530 | 55.8 | −1.81 |
| 9 | | 1.319140 (ASP) | 0.300 | | | | |
| 10 | IR-filter | Plano | 0.300 | Glass | 1.516 | 64.1 | — |
| 11 | | Plano | 0.313 | | | | |
| 12 | Image | Plano | — | | | | |

Note:
Reference wavelength is d-line 587.6 nm

Furthermore, it can be observed from Table 2-1 that the surfaces of the first lens element 210, the second lens element 220, the third lens element 230, and the fourth lens element 240 are aspheric. The aspheric surfaces satisfy the Condition ASP, but are not limited thereto. As for the parameters of the aspheric surfaces, reference is made to Table 2-2 below.

TABLE 2-2

Aspheric Coefficients

| Surface# | | | | |
|---|---|---|---|---|
| | 2 | 3 | 4 | 5 |
| k | −8.67674E−01 | −5.05133E+00 | 9.00000E+01 | 7.62993E+00 |
| $A_4$ | 6.47311E−02 | 2.03693E−02 | 1.07226E−01 | 1.92016E−01 |
| $A_6$ | −2.00332E−01 | −4.25502E−01 | −5.33186E−01 | −6.47594E−01 |
| $A_8$ | 1.01103E+00 | 9.21331E−01 | 1.68294E+00 | 2.68815E+00 |
| $A_{10}$ | −2.88516E+00 | −2.46197E+00 | −3.78669E+00 | −5.70332E+00 |
| $A_{12}$ | 4.77706E+00 | 4.09522E+00 | 3.09984E+00 | 6.33004E+00 |
| $A_{14}$ | −5.96143E+00 | −8.53466E+00 | −3.65278E+00 | −3.78100E+00 |
| $A_{16}$ | 2.89704E−01 | 7.24564E−01 | 4.40512E+00 | 2.09276E+00 |

| Surface# | | | | |
|---|---|---|---|---|
| | 6 | 7 | 8 | 9 |
| k | −9.00000E+01 | −3.09269E+00 | −2.25220E−01 | −1.63366E+01 |
| $A_4$ | −9.65199E−02 | −2.93402E−01 | −7.31710E−01 | 1.99368E−02 |
| $A_6$ | 2.38002E−01 | 7.47347E−01 | 1.76040E+00 | −1.50675E−01 |
| $A_8$ | −4.73006E−01 | −1.12470E+00 | −2.75643E+00 | 1.69450E−01 |
| $A_{10}$ | 5.17934E−01 | 9.59252E−01 | 2.67614E+00 | −1.10210E−01 |
| $A_{12}$ | −3.42032E−01 | −4.57397E−01 | −1.62984E+00 | 4.44513E−02 |
| $A_{14}$ | 1.31438E−01 | 1.14914E−01 | 6.25352E−01 | −1.12963E−02 |
| $A_{16}$ | −2.71254E−02 | −1.18371E−02 | −1.46670E−01 | 1.75778E−03 |
| $A_{18}$ | — | — | 1.91964E−02 | −1.53369E−04 |
| $A_{20}$ | — | — | −1.07440E−03 | 5.75098E−06 |

The content of Table 2-3 may be deduced from Table 2-1.

TABLE 2-3

Embodiment 2

| f (mm) | 3.22 | $T_{23}/f$ | 0.24 |
|---|---|---|---|
| Fno | 3.00 | $CT_2/T_{23}$ | 0.36 |
| HFOV (deg.) | 39.5 | $10 * (CT_2/CT_4)$ | 9.10 |
| $V_1 - V_2$ | 32.10 | $CT_2$ (mm) | 0.28 |
| $(R_2 + R_1)/(R_2 - R_1)$ | 0.82 | TTL (mm) | 3.76 |
| $R_8/R_7$ | −0.345 | SL/TTL | 0.98 |

TABLE 2-3-continued

Embodiment 2

| $f_3/|R_5|$ | 0.04 | TTL/Imgh | 1.40 |
|---|---|---|---|
| $f_4/T_{23}$ | −2.38 | | |

FIG. 2B is a schematic view of longitudinal spherical aberration curves when the lights having wavelengths of 486.1 nm, 587.6 nm, and 656.3 nm are respectively projected in the optical imaging lens assembly in FIG. 2A. It can be observed from FIG. 2B that, when the different wavelengths, 486.1 nm, 587.6 nm, or 656.3 nm, of the light are received by the optical imaging lens assembly 20 of this embodiment, the longitudinal spherical aberration generated by the optical imaging lens assembly 20 are within a range of −0.025 mm to 0.025 mm.

FIG. 2C is a schematic view of astigmatic field curves when the light having the wavelength of 587.6 nm is projected in the optical imaging lens assembly in FIG. 2A. It can be observed from FIG. 2C that, the astigmatic field curvature of the tangential plane generated when the light having the wavelength of 587.6 nm is projected in the optical imaging lens assembly 20 is within a range of −0.1 mm to 0.05 mm, and the astigmatic field curvature of the sagittal plane is within a range of −0.05 mm to 0.01 mm.

FIG. 2D is a schematic view of a distortion curve when the light having the wavelength of 587.6 nm is projected in the optical imaging lens assembly in FIG. 2A. It can be observed from FIG. 2D that, the distortion ratio generated when the light having the wavelength of 587.6 nm is projected in the optical imaging lens assembly 20 is within a range of −1.25% to 4%. As shown in FIGS. 2B to 2D, the optical imaging lens assembly 20, designed according to the second embodiment, is capable of effectively correcting various aberrations.

The Third Embodiment (Embodiment 3)

FIG. 3A is a schematic structural view of a third embodiment of an optical imaging lens assembly according to the present disclosure. The specific implementation and the elements of the third embodiment are substantially the same as those in the first embodiment. The element symbols in the third embodiment corresponds to the symbols in the first embodiment and have the same function or structure, but the element symbols in the third embodiment all begin with "3".

For conciseness, only the differences among embodiments are illustrated below, and the similarities will not be repeated herein.

In this embodiment, for example, the wavelength of the light received by the optical imaging lens assembly 30 is 587.6 nm. However, this wavelength may be adjusted according to actual requirements, and is not limited to the wavelength value mentioned above.

In this embodiment, the refractive of a first lens element 310 is positive and the first element 310 has a convex object-side surface 311. The refractive power of a second lens element 320 negative and the second lens element 320 has a concave object-side surface 321. The refractive power of a third lens element 330 is positive and the third lens element 330 has a convex image-side surface 332. The refractive power of a fourth lens element 340 is negative and the fourth lens element 440 has a concave image-side surface 342.

The detailed data of the optical imaging lens assembly 30 is as shown in Table 3-1 below.

TABLE 3-1

Embodiment 3
f = 3.47 mm, Fno = 2.50, HFOV = 37.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.150 | | | | |
| 2 | Lens 1 | 1.278830 (ASP) | 0.480 | Plastic | 1.530 | 55.8 | 2.59 |
| 3 | | 16.401900 (ASP) | 0.142 | | | | |
| 4 | Lens 2 | −3.075700 (ASP) | 0.186 | Plastic | 1.633 | 23.4 | −6.35 |
| 5 | | −13.430900 (ASP) | 0.868 | | | | |
| 6 | Lens 3 | −21.780000 (ASP) | 0.620 | Plastic | 1.633 | 23.4 | 3.08 |
| 7 | | −1.809390 (ASP) | 0.351 | | | | |
| 8 | Lens 4 | −17.469300 (ASP) | 0.350 | Plastic | 1.583 | 30.2 | −2.14 |
| 9 | | 1.353560 (ASP) | 0.300 | | | | |
| 10 | IR-filter | Plano | 0.300 | Glass | 1.516 | 64.1 | — |
| 11 | | Plano | 0.351 | | | | |
| 12 | Image | Plano | — | | | | |

Note:
Reference wavelength is d-line 587.6 nm

Furthermore, it can be observed from Table 3-1 that the surfaces of the first lens element 310, the second lens element 320, the third lens element 330, and the fourth lens element 340 are aspheric. The aspheric surfaces can satisfy the Condition ASP, but are not limited thereto. As for the parameters of the aspheric surfaces, reference is made to Table 3-2 below.

TABLE 3-2

Aspheric Coefficients

| | Surface# | | | |
|---|---|---|---|---|
| | 2 | 3 | 4 | 5 |
| k | −8.89986E−01 | 2.71721E+01 | 5.95219E+00 | −4.47160E+01 |
| $A_4$ | 6.68200E−02 | −6.91207E−02 | 1.22407E−01 | 2.66263E−01 |
| $A_6$ | −1.50813E−01 | −4.29749E−01 | −4.29586E−01 | −4.34722E−01 |
| $A_8$ | 7.47063E−01 | 9.78449E−01 | 1.67205E+00 | 2.39647E+00 |
| $A_{10}$ | −2.50799E+00 | −2.67882E+00 | −3.87223E+00 | −5.45076E+00 |
| $A_{12}$ | 4.35472E+00 | 3.56133E+00 | 4.20243E+00 | 6.91108E+00 |
| $A_{14}$ | −4.58714E+00 | −3.05677E+00 | −1.29177E+00 | −3.92069E+00 |
| $A_{16}$ | 7.77784E−01 | 8.71618E−01 | −2.08980E−02 | 7.09841E−01 |

| | Surface# | | | |
|---|---|---|---|---|
| | 6 | 7 | 8 | 9 |
| k | −2.82286E+01 | −3.06436E−01 | 6.81834E+01 | −2.36679E+01 |
| $A_4$ | −1.11776E−01 | −2.05304E−01 | −8.37385E−01 | 5.14020E−03 |
| $A_6$ | 3.08786E−01 | 7.16269E−01 | 1.79201E+00 | −1.52360E−01 |
| $A_8$ | −5.49517E−01 | −1.11958E+00 | −2.74043E+00 | 1.73464E−01 |
| $A_{10}$ | 5.37320E−01 | 9.76389E−01 | 2.67252E+00 | −1.10429E−01 |
| $A_{12}$ | −3.14641E−01 | −4.63666E−01 | −1.63064E+00 | 4.41837E−02 |
| $A_{14}$ | 1.08563E−01 | 1.12038E−01 | 6.25245E−01 | −1.12574E−02 |
| $A_{16}$ | −2.08125E−02 | −1.11329E−02 | −1.46692E−01 | 1.76369E−03 |
| $A_{18}$ | — | — | 1.91926E−02 | −1.54165E−04 |
| $A_{20}$ | — | — | −1.07540E−03 | 5.68615E−06 |

The content of Table 3-3 may be deduced from Table 3-1.

TABLE 3-3

Embodiment 3

| f (mm) | 3.47 | $T_{23}/f$ | 0.25 |
|---|---|---|---|
| Fno | 2.50 | $CT_2/T_{23}$ | 0.21 |
| HFOV (deg.) | 37.4 | $10*(CT_2/CT_4)$ | 5.31 |
| $V_1 - V_2$ | 32.20 | $CT_2$ (mm) | 0.19 |
| $(R_2 + R_1)/(R_2 - R_1)$ | 1.17 | TTL (mm) | 3.70 |
| $R_8/R_7$ | −0.077 | SL/TTL | 0.96 |
| $f_3/|R_5|$ | 0.14 | TTL/Imgh | 1.40 |
| $f_4/T_{23}$ | −2.46 | | |

FIG. 3B is a schematic view of longitudinal spherical aberration curves when the lights having wavelengths of 486.1 nm, 587.6 nm, and 656.3 nm are respectively projected in the optical imaging lens assembly in FIG. 3A. It can be observed from FIG. 3B that, when the different wavelengths, 486.1 nm, 587.6 nm, or 656.3 nm, of the light are received by the optical imaging lens assembly 30 of this embodiment, the longitudinal spherical aberrations generated by the optical imaging lens assembly 30 are within a range of −0.050 mm to 0.025 mm.

FIG. 3C is a schematic view of astigmatic field curves when the light having the wavelength of 587.6 nm is projected in the optical imaging lens assembly in FIG. 3A. It can be observed from FIG. 3C that, the astigmatic field curvature of the tangential plane generated when the light having the wavelength of 587.6 nm is projected in the optical imaging lens assembly 30 is within a range of −0.1 mm to 0.05 mm, and the astigmatic field curvature of the sagittal plane is within a range of −0.050 mm to 0.0 mm.

FIG. 3D is a schematic view of a distortion curve when the light having the wavelength of 587.6 nm is projected in the optical imaging lens assembly in FIG. 3A. It can be observed from FIG. 3D that, the distortion ratio generated when the light having the wavelength of 587.6 nm is projected in the optical imaging lens assembly 30 is within a range of −1.25% to 4%. As shown in FIGS. 3B to 3D, the optical imaging lens assembly 30, designed according to the third embodiment, is capable of effectively correcting various aberrations.

The Fourth Embodiment (Embodiment 4)

FIG. 4A is a schematic structural view of a fourth embodiment of the optical imaging lens assembly according to the present invention. The specific implementation and the elements of the fourth embodiment are substantially the same as those in the first embodiment. The element symbols in the fourth embodiment corresponds to the symbols in the first embodiment and have the same function or structure, but the element symbols in the fourth embodiment all begin with "4". For conciseness, only the differences among embodiments are illustrated below, and the similarities will not be repeated herein.

In this embodiment, for example, the wavelength of the light received by the optical imaging lens assembly 40 is 587.6 nm, but this wavelength may be adjusted according to actual requirements and is not limited to the wavelength value mentioned above.

In this embodiment, the refractive power of the first lens element 410 is positive and the first element 410 has a convex object-side surface 411. The refractive power of a second lens element 420 negative and the second element 420 has a concave object-side surface 421. The refractive power of a third lens element 430 is positive and the third lens element 430 has a convex image-side surface 432. The refractive power of a fourth lens element 440 is negative and the fourth lens element 440 has a concave image-side surface 442.

The detailed data of the optical imaging lens assembly 40 is as shown in Table 4-1 below.

TABLE 4-1

Embodiment 4
f = 3.83 mm, Fno = 3.00, HFOV = 34.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.095 | | | | |
| 2 | Lens 1 | 1.716090 (ASP) | 0.693 | Plastic | 1.514 | 56.8 | 2.65 |
| 3 | | −5.647000 (ASP) | 0.077 | | | | |
| 4 | Lens 2 | −6.909700 (ASP) | 0.250 | Plastic | 1.614 | 25.6 | −5.03 |
| 5 | | 5.660300 (ASP) | 1.014 | | | | |
| 6 | Lens 3 | 22.205100 (ASP) | 0.958 | Plastic | 1.530 | 55.8 | 2.40 |
| 7 | | −1.331620 (ASP) | 0.296 | | | | |
| 8 | Lens 4 | −2.799840 (ASP) | 0.294 | Plastic | 1.514 | 56.8 | −1.83 |
| 9 | | 1.471000 (ASP) | 0.400 | | | | |
| 10 | IR-filter | Plano | 0.300 | Glass | 1.516 | 64.1 | — |
| 11 | | Plano | 0.299 | | | | |
| 12 | Image | Plano | — | | | | |

Note:
Reference wavelength is d-line 587.6 nm

Furthermore, it can be observed from Table 4-1 that the surfaces of the first lens element 410, the second lens element 420, the third lens element 430, and the fourth lens element 440 are aspheric. The aspheric surfaces can satisfy the Condition ASP, but are not limited thereto. As for the parameters of the aspheric surfaces, reference is made to Table 4-2 below.

TABLE 4-2

Aspheric Coefficients

| Surface# | | | | |
|---|---|---|---|---|
| | 2 | 3 | 4 | 5 |
| k | −1.31887E+00 | −7.63063E+01 | 5.07128E+01 | −2.87342E+00 |
| $A_4$ | 5.27913E−02 | 4.04736E−03 | 1.44960E−01 | 1.60686E−01 |
| $A_6$ | −2.59452E−01 | −2.44750E−01 | −5.16446E−01 | −7.39861E−01 |
| $A_8$ | 1.17697E+00 | 1.04745E+00 | 1.72345E+00 | 2.68256E+00 |
| $A_{10}$ | −2.83482E+00 | −2.78910E+00 | −3.51416E+00 | −5.57592E+00 |
| $A_{12}$ | 3.55878E+00 | 3.79706E+00 | 3.97676E+00 | 6.50857E+00 |
| $A_{14}$ | −2.46838E+00 | −2.84004E+00 | −2.60283E+00 | −3.91695E+00 |
| $A_{16}$ | 6.96371E−01 | 6.98691E−01 | 8.74495E−01 | 9.65771E−01 |

| Surface# | | | | |
|---|---|---|---|---|
| | 6 | 7 | 8 | 9 |
| k | 9.00000E+01 | −3.51112E+00 | −2.71433E+00 | −2.05660E+01 |
| $A_4$ | −7.32394E−02 | −2.77354E−01 | −7.31824E−01 | 1.14370E−02 |
| $A_6$ | 1.95516E−01 | 7.42151E−01 | 1.76336E+00 | −1.48132E−01 |
| $A_8$ | −4.35508E−01 | −1.12902E+00 | −2.75621E+00 | 1.71865E−01 |
| $A_{10}$ | 5.13482E−01 | 9.58337E−01 | 2.67601E+00 | −1.10510E−01 |
| $A_{12}$ | −3.53033E−01 | −4.57386E−01 | −1.62990E+00 | 4.42576E−02 |
| $A_{14}$ | 1.30791E−01 | 1.14987E−01 | 6.25357E−01 | −1.12521E−02 |
| $A_{16}$ | −2.11861E−02 | −1.17858E−02 | −1.46667E−01 | 1.76018E−03 |

TABLE 4-2-continued

Aspheric Coefficients

| $A_{18}$ | — | — | 1.91975E-02 | -1.54342E-04 |
|---|---|---|---|---|
| $A_{20}$ | — | — | -1.07478E-03 | 5.80638E-06 |

The content of Table 4-3 may be deduced from Table 4-1.

TABLE 4-3

Embodiment 4

| f (mm) | 3.83 | $T_{23}/f$ | 0.26 |
|---|---|---|---|
| Fno | 3.00 | $CT_2/T_{23}$ | 0.25 |
| HFOV (deg.) | 34.7 | $10 * (CT_2/CT_4)$ | 8.50 |
| $V_1 - V_2$ | 31.20 | $CT_2$ (mm) | 0.25 |
| $(R_2 + R_1)/(R_2 - R_1)$ | 0.53 | TTL (mm) | 4.39 |
| $R_8/R_7$ | -0.526 | SL/TTL | 0.98 |
| $f_3/|R_5|$ | 0.11 | TTL/Imgh | 1.63 |
| $f_4/T_{23}$ | -1.82 | | |

FIG. 4B is a schematic view of longitudinal spherical aberration curves when the lights having wavelengths of 486.1 nm, 587.6 nm, and 656.3 nm are respectively projected in the optical imaging lens assembly in FIG. 4A. It can be observed from FIG. 4B that, when the different wavelengths, 486.1 nm, 587.6 nm, or 656.3 nm, of the light are received by the optical imaging lens assembly 40 of this embodiment, the longitudinal spherical aberration generated by the optical imaging lens assembly 40 is within a range of -0.025 mm to 0.025 mm.

FIG. 4C is a schematic view of astigmatic field curves when the light having the wavelength of 587.6 nm is projected in the optical imaging lens assembly in FIG. 4A. It can be observed from FIG. 4C that, the astigmatic field curvature of the tangential plane generated when the light having the wavelength of 587.6 nm is projected in the optical imaging lens assembly 40 is within a range of -0.18 mm to 0.07 mm, and the astigmatic field curvature of the sagittal plane is within a range of -0.02 mm to 0.05 mm.

FIG. 4D is a schematic view of a distortion curve when the light having the wavelength of 587.6 nm is projected in the optical imaging lens assembly in FIG. 4A. It can be observed from FIG. 4D that, the distortion ratio generated when the light having the wavelength of 587.6 nm is projected in the optical imaging lens assembly 40 is within a range of -0.05% to 4%. As shown in FIGS. 4B to 4D, the optical imaging lens assembly 40, designed according to the fourth embodiment, is capable of effectively correcting various aberrations.

What is claimed is:

1. An optical imaging lens assembly comprising, in order from an object side to an image side:
a first lens element with positive refractive power;
a second lens element with negative refractive power;
a third lens element with positive refractive power having a convex image-side surface; and
a fourth lens element with negative refractive power having a concave image-side surface, and at least one of the object-side and the image-side surfaces of the fourth lens element being aspheric;
wherein the optical imaging lens assembly further comprises a stop and an image sensor, the image sensor is disposed on an image plane, a radius of curvature of the object-side surface of the fourth lens element is R7, a radius of curvature of the image-side surface of the fourth lens element is R8, an axial distance between the stop and the image plane is SL, an axial distance between the object-side surface of the first lens element and the image plane is TTL, one half of the diagonal length of the effective photosensitive area of the image sensor is Imgh, a focal length of the fourth lens element is f4, an axial distance between the second lens element and the third lens element is T23, and following conditions are satisfied:

$-0.7 < R8/R7 < 0.0$;

$0.9 < SL/TTL < 1.1$;

$1.15 < TTL/Imgh < 1.65$; and $-3.0 < f4/T23 < -1.5$.

2. The optical imaging lens assembly according to claim 1, wherein the object-side surface of the first lens element is convex and the second lens element is made of plastic.

3. The optical imaging lens assembly according to claim 2, further satisfying the following condition: 2.8 mm<TTL<4.3 mm.

4. The optical imaging lens assembly according to claim 2, wherein an Abbe number of the first lens element is V1, an Abbe number of the second lens element is V2, and the optical imaging lens assembly satisfies the following condition: 25<V1−V2<40.

5. The optical imaging lens assembly according to claim 4, wherein a thickness of the second lens element near the optical axis is CT2, and the optical imaging lens assembly satisfies the following condition: 0.13 mm<CT2<0.3 mm.

6. The optical imaging lens assembly according to claim 4, wherein a thickness of the second lens element near the optical axis is CT2, a thickness of the fourth lens element near the optical axis is CT4, and the optical imaging lens assembly satisfies the following condition: 4.5<10*(CT2/CT4)<9.5.

7. The optical imaging lens assembly according to claim 1, wherein the object-side surface of the second lens element is concave, an axial distance between the second lens element and the third lens element is T23, a focal length of the optical imaging lens assembly is f, and the optical imaging lens assembly satisfies the following condition: 0.1<T23/f<0.3.

8. The optical imaging lens assembly according to claim 1, wherein a radius of curvature of the object-side surface of the first lens element is R1, a radius of curvature of the image-side surface of the first lens element is R2, and the optical imaging lens assembly satisfies the following condition: 0.5<(R2+R1)/(R2−R1)<1.5.

9. The optical imaging lens assembly according to claim 8, further satisfying the following condition: 1.2<TTL/Imgh<1.5.

10. An optical imaging lens assembly comprising, in order from an object side to an image side:
a first lens element with positive refractive power;
a second lens element with negative refractive power;
a third lens element with positive refractive power having a convex image-side surface; and
a fourth lens element with negative refractive power having a concave image-side surface, and at least one of the object-side and the image-side surfaces of the fourth lens element being aspheric;
wherein the optical imaging lens assembly further comprises a stop and an image sensor, the image sensor is disposed on an image plane, a radius of curvature of the object-side surface of the fourth lens element is R7, a radius of curvature of the image-side surface of the fourth lens element is R8, an axial distance between the second lens element and the third lens element is T23, a thickness of the second lens element near the optical axis is CT2, an axial distance between the stop and the image plane is SL, an axial distance between the object-side surface of the first lens element and the image plane is TTL, and one half of the diagonal length of the effective photosensitive area of the image sensor is Imgh, and following conditions are satisfied:

$-0.7<R8/R7<0.0;$ $0.1<CT2/T23<0.4;$ $0.9<SL/TTL<1.1;$ and $1.15<TTL/Imgh<1.65.$ 11. The optical imaging lens assembly according to claim 10, wherein a focal length of the fourth lens element is f4, an axial distance between the second lens element and the third lens element is T23 and the optical imaging lens assembly satisfies the following condition: $-3.0<f4/T23<-1.5$.

12. The optical imaging lens assembly according to claim 10, wherein a thickness of the fourth lens element near the optical axis is CT4, and the optical imaging lens assembly satisfies the following condition: $4.5<10*(CT2/CT4)<9.5$.

13. The optical imaging lens assembly according to claim 12, further satisfying the following condition: 2.8 mm<TTL<4.3 mm.

14. The optical imaging lens assembly according to claim 10, wherein a radius of curvature of the object-side surface of the first lens element is R1, a radius of curvature of the image-side surface of the first lens element is R2, and the optical imaging lens assembly satisfies the following condition: $0.5<(R2+R1)/(R2-R1)<1.5$.

15. The optical imaging lens assembly according to claim 10, wherein a focal length of the third lens element is f3, a radius of curvature of the object-side surface of the third lens element is R5, and the optical imaging lens assembly satisfies the following condition: $0<f3/|R5|<0.2$.

16. The optical imaging lens assembly according to claim 10, further satisfying the following condition: $1.2<TTL/Imgh<1.5$.

* * * * *